United States Patent
Fink et al.

(10) Patent No.: US 8,261,324 B2
(45) Date of Patent: Sep. 4, 2012

(54) IDENTIFICATION AND VERIFICATION OF PERIPHERAL DEVICES ACCESSING A SECURE NETWORK

(75) Inventors: Russell A. Fink, Laurel, MD (US); Tommy O. Johnson, Dayton, MD (US); Shaun T. Hutton, Silver Spring, MD (US); Kevin Z. Snow, Cary, NC (US)

(73) Assignee: The Johns Hopkins University, Baltimore, MD (US)

( * ) Notice: Subject to any disclaimer, the term of this patent is extended or adjusted under 35 U.S.C. 154(b) by 352 days.

(21) Appl. No.: 12/570,702

(22) Filed: Sep. 30, 2009

(65) Prior Publication Data
US 2010/0088747 A1    Apr. 8, 2010

Related U.S. Application Data

(60) Provisional application No. 61/103,425, filed on Oct. 7, 2008.

(51) Int. Cl.
*G06F 7/04* (2006.01)
*G06F 15/16* (2006.01)
*G06F 17/30* (2006.01)
*H04L 29/06* (2006.01)

(52) U.S. Cl. ............... 726/3; 713/185; 705/4; 705/302; 705/305; 705/306

(58) Field of Classification Search .......... 726/3; 705/4, 705/302, 305, 306
See application file for complete search history.

(56) References Cited

U.S. PATENT DOCUMENTS

| | | | | |
|---|---|---|---|---|
| 6,381,703 | B1 * | 4/2002 | Noh ............................. | 713/503 |
| 7,222,239 | B2 * | 5/2007 | Smith .......................... | 713/185 |
| 2006/0066317 | A1 * | 3/2006 | Koch et al. ................... | 324/618 |
| 2009/0070857 | A1 * | 3/2009 | Azuma .......................... | 726/3 |

FOREIGN PATENT DOCUMENTS
WO  WO2005/009003  *  7/2003
* cited by examiner

*Primary Examiner* — William Powers
*Assistant Examiner* — Dant Shaifer Harriman
(74) *Attorney, Agent, or Firm* — Aisha Ahmad

(57) ABSTRACT

A system and method for identifying and verifying a client to access a secure network. Timing characteristics are acquired from the client, such as a peripheral device, and further verified and identified via a policy enforcement points and a policy decision points, or a measurer device in the secure network.

10 Claims, 4 Drawing Sheets

IDENTIFICATION AND VERIFICATION OF PERIPHERAL DEVICES ACCESSING A SECURE NETWORK

CROSS-REFERENCE TO RELATED APPLICATION

This application claims benefit under 35 U.S.C. §120 of a previously filed provisional application Ser. No. 61/103,425, entitled, "Passive Forensic Identification for Network Access Control of Computing Devices," filed on Oct. 7, 2008.

BACKGROUND

Typically, computer networks employ perimeter defenses such as network firewalls to secure the corporate network by blocking unauthorized inbound access attempts from the Internet. However, motivated adversaries will find ways to bypass perimeter defenses—perhaps by physical intrusion into office spaces—to access networks at their weakest point, behind the firewall. As the value of corporate information is on the rise, there is a need for a more secure means of protecting access to networks even in the face of physical security breaches.

In trying to protect the network from unauthorized access, a network administrator could try to identify the source of unauthorized access into the network, despite an adversary's attempts at masking their network identity. One solution includes a TCP/IP trace back technique used to trace the path of attacks back to the source, but they cannot map attacks to a specific machine.

Some networks employ Network Access Control (NAC) systems to enforce security policy at the physical points of connection into the network. Present-day NAC solutions utilize special client software installed onto desktop and laptop computers to inspect and report configuration states to a Policy Enforcement Point (PEP), which in turn provides the data to a Policy Decision Point (PDP) to render a decision on whether to admit the device onto the network. Issues arise when certain types of networked devices cannot support such client software —for example, storage devices, printers, and Voice over IP (VoIP) telephones and other network-connected specialized devices. In these cases, conventional NAC systems follow a simple policy of searching for the device's link-layer Media Access Control (MAC) address in an approved list, and if found, admitting the device into the network. Such a policy is useless against a malicious device that can spoof or impersonate, the MAC address of a legitimate device in order to gain access the network.

BRIEF DESCRIPTION OF THE DRAWINGS/FIGURES

DETAILED DESCRIPTION

Disclosed herein are a method and system directed to employing linear regression, for example, to verify the identity of devices using clock skews or time drift of generic computing devices trying to gain access to a secure network. Although we describe the method employing linear regression, it should be understood that any verification determination involving timing characteristics may be employed. This method for correlating identity to timing characteristics allows a certain class of dumb devices—clients that cannot run arbitrary network access control software—to be "fingerprinted" to determine whether the client will be allowed access to the secure network.

The device fingerprinting method employs a processor, for example, that computes a clock skew by capturing multiple samples of TCP timestamps from a client that requests a connection to a protected network, where the timestamps reflect the client's uncorrected system time. The method then computes a clock skew—an average value of time gained or lost relative to a measurer, computed from the timestamp samples—and compares the clock skew to a reference clock skew created during a training phase of the method. Clock skews are probabilistically unique to each client in that multiple clients will exhibit distinct clock skews with high probability when compared to one another. The benefit of this method is that clock skews reflect actual, immutable physical characteristics of the client. This method is costly to subvert: an attacker would have to adjust the natural clock skew characteristic of an imposter device to impersonate a characteristic of some other, valid device, requiring prior training data from the valid device as well as modifying the imposter client's network software and firmware to reflect the proper timestamps.

The device fingerprinting method overcomes the problems of existing NAC solutions that can use only time-invariant protocol details such as Media Access Control (MAC) addresses that could be imitated easily by adversaries. Further, it overcomes the problem of optional TCP timestamps, e.g., situations when the client is configured to omit the timestamp, in cases where the connecting client can, and cannot be modified. When the client cannot be modified, other parts of protocols can be analyzed to determine time drift. Two examples include: (a) the rate of change of the Initial Sequence Numbers (ISN)—used when establishing connections—can be correlated to clock drift; and (b) packet inter-arrival times can be correlated to clock drift for Voice over IP (VoIP) phones. Alternatively, if the connecting systems can be modified, the device fingerprinting method can enforce a network policy that requires timestamps for all connecting devices, such that any device that supports timestamps but chooses to not present them is denied access to the network. Either technique would raise the bar for adversaries to impose on the network and passively capture sensitive corporate data.

Figure 1:
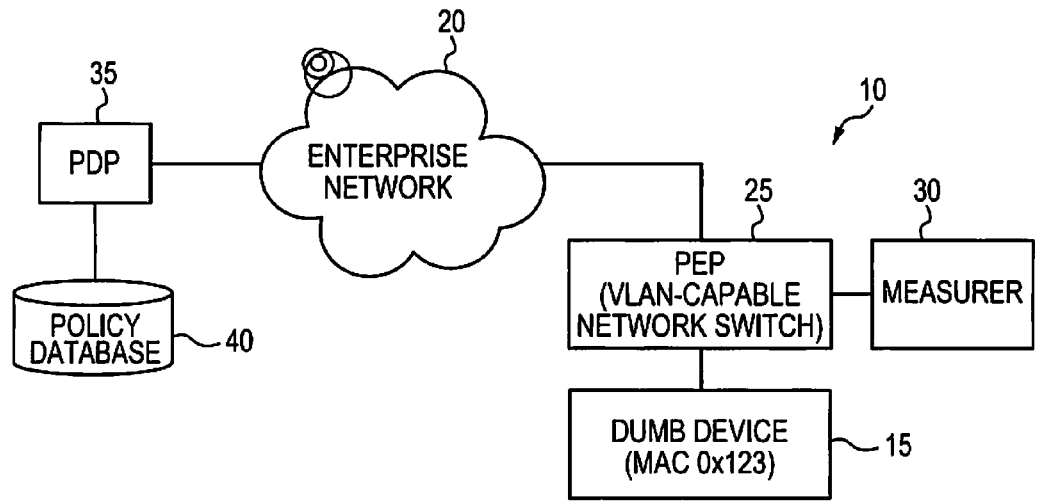
FIG. 1 is an exemplary block diagram of an overview of the network employing network fingerprinting.

FIG. 1 is a block diagram of an overview of a system 10 employing device fingerprinting in order to maintain security on the network 20. A dumb device 15, or client, tries to connect to the enterprise network 20 which employs the device fingerprinting method embodied in the present invention. The dumb device can include, but is not limited to, a voice over internet phone, a printer, facsimile, a network area storage device, and a scanner among other peripheral devices. Device 15 interacts with a Policy Enforcement Point (PEP) 25 that detects the newly connected device, and obtains its MAC address as part of the dumb device's request to connect with the network 20. The Policy Decision Point (PDP) 35 is responsible for admitting a device onto the network, or denying access to that device 15. The architecture divides the responsibilities for measurement, decision making, and enforcement into separate entities to match existing network access control system designs, and to facilitate component specialization and reuse, minimizing enterprise costs.

The measurer device 30 obtains a claimed (but unverified) MAC address for the dumb device 15 via the PEP 25. Although not shown, the measurer can also obtain the MAC address from the device 15 via the measurer device 30 if the processing portion of the system is located at the measurer. The measurer device 30 sends the claimed MAC address of the dumb device 15 to the PDP 35. The PDP 35 looks up the relevant set of characteristics from the policy database 40 based on the claimed MAC address. Based on the type of device represented by the reported MAC address, the PDP determines: a set of timing characteristics to measure; an appropriate algorithm for determining the hardware fingerprint from the measurements; and the number or duration of measurement samples required to achieve a certain comparison accuracy, and sends these to the measurer 30. The measurer device 30 communicates passively or actively (based on specific timing characteristic) with the dumb device 15 and records timing information produced by device 15 for the required length of time or number of samples as dictated by the policy sent from the PDP 35.

Continuing with FIG. 1, the measurer 30 computes the fingerprint of the dumb device 15 from the recorded timing information using the algorithm specified by policy of the network. Algorithms for computing the device timing fingerprint include but are not limited to linear regression of TCP timestamps, linear regression of ISN "buckets," discrete Fourier transforms (frequency histograms) of packet interarrival times, and average and standard deviation of packet interarrival times. After the measurer 30 computes the fingerprint of the dumb device 15, the measurer sends the fingerprint back to the PDP 35, along with the MAC address of the dumb device 15.

With continued reference to FIG. 1, the PDP 35 looks up the expected fingerprint value for the claimed MAC address from the policy database 40. The PDP compares the fingerprint reported by the measurer 30 with the expected fingerprint using a technique appropriate for the data collected, these techniques include but are not limited to direct equality, spectral comparisons of frequency histograms, average and standard deviation of packet interarrival times, statistical analysis of linear regression error, and others. If the reported fingerprint matches the expected fingerprint, then the PDP 35 approves the request for access, and sends the approval to the PEP 25 that admits the dumb device 15 onto the network. If the reported fingerprint does not match the expected fingerprint, then the PDP 35 denies the request for access, and advises the PEP 25 to block network access to the dumb device 15.

Figure 2:
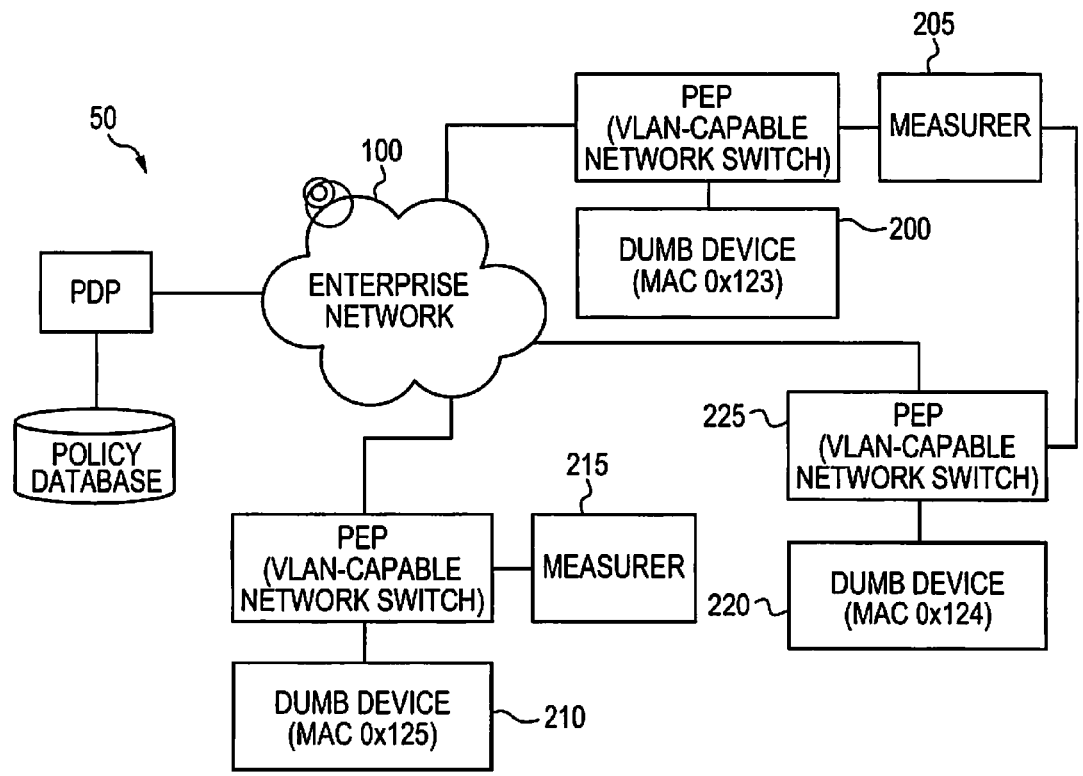
FIG. 2 is an exemplary illustration of an alternate embodiment of a network employing network fingerprinting, showing alternative configurations for the network and measurer component.

FIG. 2 an exemplary illustration of an alternate embodiment of a network employing network fingerprinting, showing alternative configurations for the network and measurer component. Specifically, the enterprise network 100 can support a plurality of dumb devices 200, 210, 220 connecting to different segments of the network 100. There are several differences between the alternate embodiment of system 50 compared to that illustrated in FIG. 1. A single measurer 205 can service a plurality of PEP devices 225 that service different network segments. The system can have the decision capability of measurer device 205, 215 built into policy enforcement point 225. The measurement capability can be directly built into the PDP, although a certain loss of timing characteristic collection fidelity would result because of delays caused by having to measure from across the enterprise network 100. Lastly, the measurement, enforcement, and policy decision point can be all incorporated into the PEP 225.

Figure 3:
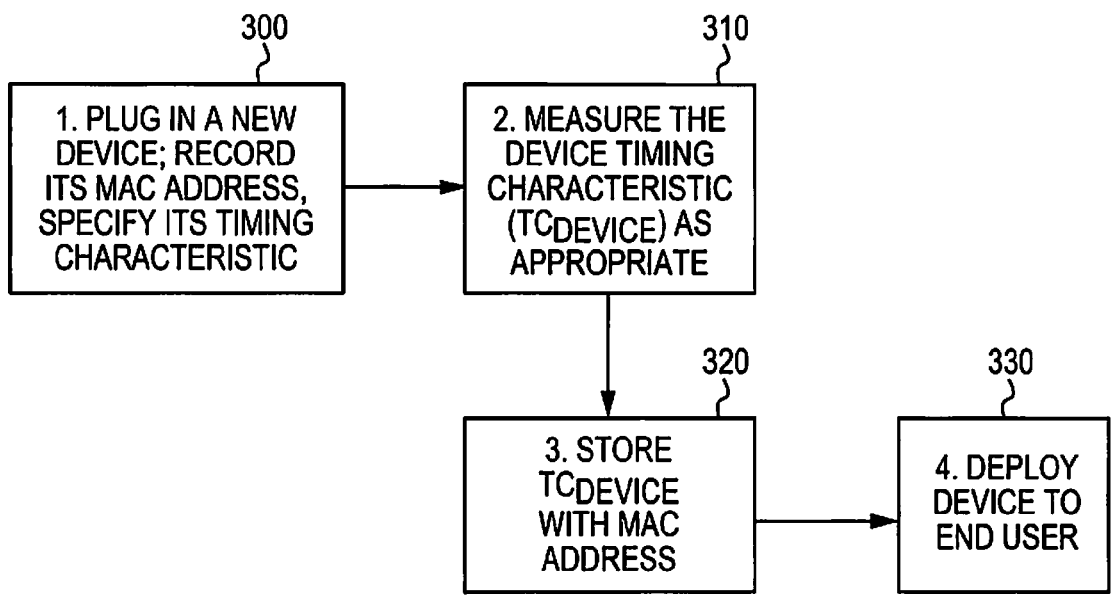
FIG. 3 is a process flowchart describing the training phase of the network fingerprinting method.

FIG. 3 is a process flowchart describing a training phase of the network fingerprinting method that computes the expected fingerprint of a newly obtained dumb device and stores it in the policy database 40 of FIG. 1. The first step of training 300 connects the dumb device to the training network, records the MAC address of the dumb device, and allows an administrator to select the type of timing characteristic appropriate to this type of dumb device. The second step 310 measures the timing characteristics of the dumb device and computes the fingerprint using the techniques described in previous paragraphs [0014] and [0015]. The third step 320 records the fingerprint—referred to in this text as the expected fingerprint—in the policy database 40 of FIG. 1. After training, the device is deployed to the user in the final step 330. After this point, the device will be measured any time it powers on or tries to connect to the network.

Figure 4:
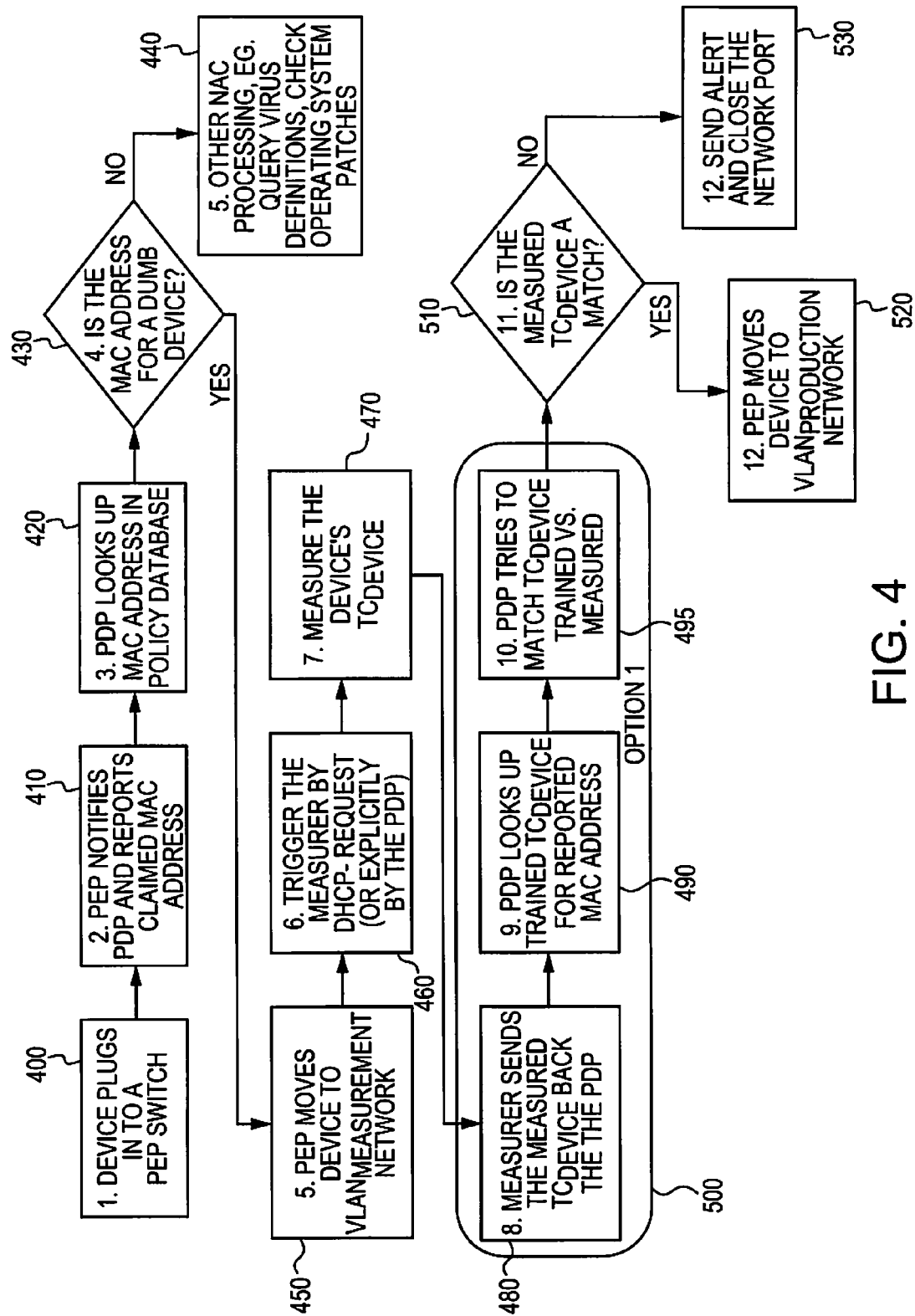
FIG. 4 is a process flow chart describing the operational phase of the network fingerprinting method.

FIG. 4 is a process flowchart describing a method for network fingerprinting.

Step 400 includes plugging in a generic device into a policy enforcement point (PEP) device so that the device can request access to the secure network. The device will report its preconfigured MAC address to the PEP. The PEP isolates the device from the network.

Step 410 includes the PEP interfacing with the policy decision point (PDP) in order to report the MAC address to the PDP.

Step 420 includes the PDP query to the policy database to obtain the type of device that holds the reported MAC address.

Step 430 includes determining whether the type of device corresponding to the reported MAC address is a dumb device (printer, phone, storage device) or a regular device (computer, server, laptop).

Step 440 includes the determination that the MAC address is for a regular device capable of running other network access control verification software, or that the MAC address is not found, and thus shall not be subject to the timing characteristic inspection of the present invention. Such regular devices are processed through normal network access control techniques.

Step 450 includes the determination that the MAC address is in the policy database and matches that of a dumb device. The present invention considers this reported MAC address as a claim that needs to be verified through timing characteristics. The PDP sends a measurement set—a list of characteristics to be measured for this particular dumb device—to the measurer. The dumb device is moved onto a measurement Virtual Local Area Network (VLAN), connecting it to the measurer.

Step 460 includes triggering the measurer. This is done in one of two ways: the dumb device can request an Internet Protocol (IP) address via the dynamic host configuration protocol (DHCP) which triggers the measurer, or the PDP can react to the query from Step 420 and activate the measurer directly.

Step 470 includes measuring the device's timing characteristic, as specified by the measurement set obtained from the PDP.

Steps 480, 490 and 495 include one option as part of the overall method of FIG. 4, in which the PDP is the component that correlates the measurements to determine the fingerprint and confirm the MAC address claim.

Step 480 includes the measurer sending back to the PDP the measured timing characteristics.

Step 490 and 495 includes the PDP computing the fingerprint from the reported measurements, and looking up the previously stored fingerprint for the device holding the claimed MAC address.

Step 510 includes determining access to the network by comparing the previously stored fingerprint to that computed from the reported measurements.

Step 520 includes determining that the computed fingerprint matches the previously known fingerprint, and moving the device onto the secure VLAN.

Step 530 includes determining that the computed fingerprint does not match the previously known fingerprint, that the device is an imposter that has illicitly copied a valid MAC address, denying further connection to any network (including the measurement VLAN), and alerting the network administrator to the imposter device.

Figure 5:
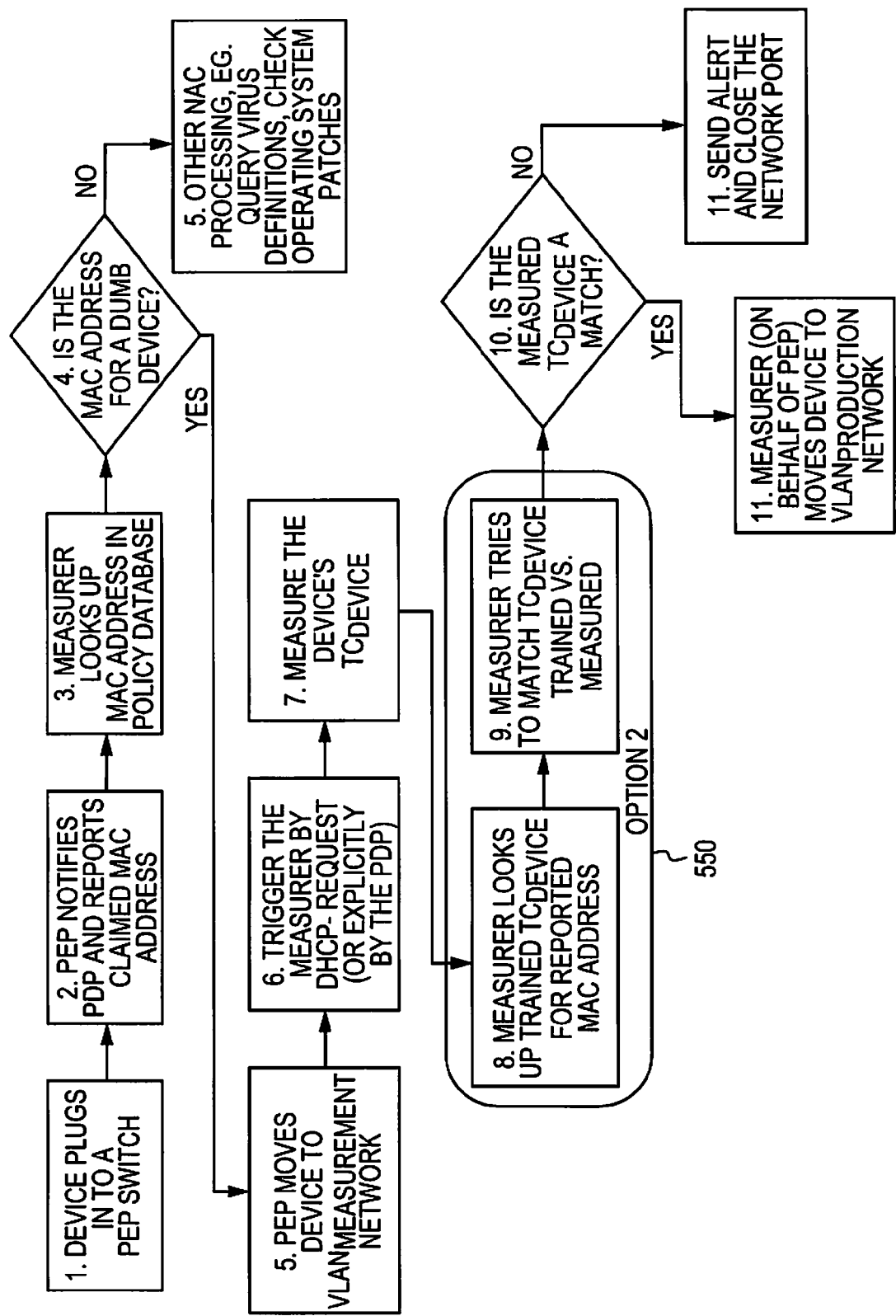
FIG. 5 is a process flow chart describing an alternative design for the operational phase of the network fingerprinting method.

FIG. 5 is similar to FIG. 4, however, block 550 includes an option in which the measurer (not the PDP) is the component that correlates the measurements to determine the fingerprint and confirm the MAC address claim. In this case, the PDP must give the fingerprinting algorithm and the previously known fingerprint to the measurer along with the measurement set so that the measurer can make the network access control decision.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method for identifying an unapproved client device seeking access to a secured network, said method comprising:
   in one or more devices connected directly or indirectly to the secured network,
   measuring and storing in a database, timing characteristics of an approved client device relative to the secured network, said measuring and storing including computing and storing a clock skew of the approved client device, based on one of multiple TCP timestamps, a rate of Initial Sequence Numbers (ISN), and packet interarrival times;
   measuring timing characteristics of the unapproved client device, after the unapproved client device has requested access to the network, the timing characteristics include multiple TCP timestamps, ISN buckets, and packet interarrival times;
   determining a hardware fingerprint of the unapproved device based on the timing characteristic, said determining based on linear regression of the multiple TCP timestamps, linear regression of the ISN bucket, discrete Fourier Transforms of the packet interarrival times, and standard deviation of packet interarrival times;
   determining a clock skew of the unapproved device by measuring a rate of change of the ISN, and the rate of change of the packet interarrival times;
   comparing the measured clock skew and the measured hardware fingerprint of the unapproved client device to the timing characteristics, including the clock skew, of the approved client device in order to match the unapproved client device to an approved client device; and
   granting access to the secured network, if the measured clock skew and the measured hardware fingerprint of the unapproved client device matches the timing characteristics, including the clock skew, of the approved client device.

2. A method as claimed in claim 1, wherein the method for identifying an unapproved client device seeking access to a secured network can be implemented on an 802.11 protocol.

3. A method as claimed in claim 1, wherein the method identifying an unapproved client device seeking access to a secured network can be implemented on layers 2 and 4 of the TCP-IP protocol.

4. A method as claimed in claim 1, wherein the unapproved client device seeking access to a secured network include printers, telephones, fax machines, and scanners.

5. A method as claimed in claim 1, wherein the clock skew of the unapproved client and the clock skew of the approved client each include the average value of the time gained or lost relative to the measuring device.

6. A method as claimed in claim 1, wherein said computing and storing includes computing and storing a clock skew of the approved client device based on multiple TCP timestamps from the approved client device.

7. A system for identifying an unapproved client device seeking access to a secured network, said system comprising:
   a policy enforcement device coupled to the unapproved client, said policy enforcement device allows the unapproved client access to the secured network, said policy enforcement point to obtain timing information from the unapproved client;
   a policy decision point coupled to the network, said policy decision point to process timing information from the unapproved client via said policy enforcement point;
   a policy database coupled to said policy decision point, the policy database includes timing information for approved client devices to access the secured network; and
   a measuring device coupled to said policy enforcement device, said measuring device to receive and process the timing information from said policy decision point, and further to compare said timing information from said policy decision point to the timing information from said policy database, if the timing information from said policy database matches the timing information from said policy decision point, the unapproved client is given access to the secure network, wherein the timing information of the approved client device stored in the policy database includes clock skew computed from time stamps captured from the approved client device, wherein the timing information of the unapproved client includes clock skew computed from time stamps captured from the unapproved client device, and wherein the policy decision point compares the clock skew of the approved client device to the clock skew of the unapproved client to determine if the timing information from the policy database matches the timing information from the policy decision point.

8. A system as claimed in claim 7, wherein a clock skew includes the average value of the time gained or lost of the unapproved client relative to said measuring device.

9. A system as claimed in claim 7, wherein said measurer processes the timing information from said policy decision point, the processing includes determining the timing information based on linear regression of the TCP timestamp, linear regression of the ISN bucket, discrete Fourier Transforms of the packet interarrival times, and standard deviation of packet interarrival times.

10. A system as claimed in claim 7, wherein the unapproved client device seeking access to a secured network include printers, telephones, fax machines, and scanners.

* * * * *